United States Patent
Young

(10) Patent No.: US 6,282,430 B1
(45) Date of Patent: Aug. 28, 2001

(54) METHOD FOR OBTAINING CONTROL INFORMATION DURING A COMMUNICATION SESSION IN A RADIO COMMUNICATION SYSTEM

(75) Inventor: Richard S. Young, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/241,666

(22) Filed: Jan. 1, 1999

(51) Int. Cl.$^7$ .................. H04B 7/00; H04B 1/16; H04B 7/208
(52) U.S. Cl. .................. 455/522; 455/343; 370/344
(58) Field of Search .................. 370/343, 344, 370/433, 435, 347; 455/522, 515, 432, 72, 434; 704/201, 208, 233, 227, 226

(56) References Cited

U.S. PATENT DOCUMENTS

| | | | |
|---|---|---|---|
| 4,811,421 | 3/1989 | Havel et al. | 455/69 |
| 4,918,734 | * 4/1990 | Muramatsu et al. | 704/214 |
| 5,095,542 | * 3/1992 | Suematsu et al. | 455/574 |
| 5,293,639 | 3/1994 | Wilson et al. | 455/17 |
| 5,299,198 | * 3/1994 | Kay et al. | 370/347 |
| 5,357,513 | 10/1994 | Kay et al. | 370/95.3 |
| 5,420,851 | * 5/1995 | Seshadri et al. | 370/280 |
| 5,524,274 | * 6/1996 | Takahashi et al. | 455/516 |
| 5,553,190 | * 9/1996 | Ohya et al. | 704/201 |
| 5,612,955 | * 3/1997 | Fernandes et al. | 370/433 |
| 5,630,016 | * 5/1997 | Swaminathan et al. | 704/228 |
| 5,740,542 | * 4/1998 | Leeper et al. | 455/516 |
| 5,754,536 | * 5/1998 | Schmidt | 370/330 |
| 5,778,026 | * 7/1998 | Zak | 375/219 |
| 5,953,694 | * 9/1999 | Pillekamp | 704/201 |
| 6,169,884 | * 1/2001 | Funk | 455/67.1 |

* cited by examiner

*Primary Examiner*—Vivian Chang
*Assistant Examiner*—Charles N. Appiah
(74) *Attorney, Agent, or Firm*—Frank M. Scutch, III

(57) ABSTRACT

A communication device receives control information during transmission of streaming data, such as speech data, over a wireless channel (300). The communication device identifies a portion of the streaming data, such as representing a pause in speech, as compressible data or white space data (310, 320). Continuous transmission of the streaming data is interrupted to request and receive control information on the wireless channel, using the channel space made available by not transmitting the identified portion of data or by transmitting it in a more compressed format (330, 340).

9 Claims, 5 Drawing Sheets

METHOD FOR OBTAINING CONTROL INFORMATION DURING A COMMUNICATION SESSION IN A RADIO COMMUNICATION SYSTEM

TECHNICAL FIELD

This invention relates in general to radio communication systems, and more particularly, to the communication of control information, such as power control information, between communication devices of a radio communication system.

BACKGROUND OF THE INVENTION

In a typical two-way radio communication system, fixed stations are geographically dispersed to provide communication support for mobile radios. A mobile radio communicates directly with a fixed station which routes such communications to another fixed station or mobile radio. Generally, the fixed stations and mobile radios exchange information in order to properly manage the resources used for communication. For example, a mobile radio may exchange call setup information with a fixed station, including channel and timing information, in order to service a particular call.

Mobile radios are often battery-powered devices, and much effort has been expended in order to minimize power consumption and to prolong battery life in these devices. In this endeavor, power control techniques have been employed in which information is exchanged between the mobile radio and the fixed station in order to determine the appropriate power level to be used in supporting a given communication session. In many prior art systems, power control information is conveyed on a control channel established for such purposes. For example, a time division multiple access (TDMA) communication system may have a time slot allocated for communicating control information. Similarly, a frequency division multiple access (FDMA) communication system may have a frequency channel devoted to such purposes.

A problem exists in systems that employed a simplex communication channel that is captured for the duration of a transmission session, when such session extends for an appreciable period of time. In such prior art systems, the mobile radio is busy supporting the transmission session, and is not in a position to receive control information until the transmission session is terminated. As a result, the mobile radio may have changed location or operating environment in such a way that the power level setting is no longer appropriate for that particular transmission session. Thus, the power level may be too low, thereby risking a loss of communication, or the power level may be too high, thereby wasting power and reducing battery life. Similarly, the conveyance of other control information may be delayed resulting in various problems.

It is desirable to frequently communicate control information between a mobile radio and a fixed station during a communication session to permit more precise management of device operating parameters and system resources. However, in some communication systems such as those that allow for uninterrupted transmission on a dedicated frequency channel, the receipt of important control information may be delayed with adverse consequences. Therefore, a new method for communicating control information is needed.

DETAILED DESCRIPTION OF THE PREFERRED EMBODIMENTS

The present invention provides for a method of communicating control information during transmission of streaming data over a wireless channel. A communication device obtains streaming data for transmission, and initiates a transmission session to transmit the streaming data over the wireless channel. The communication device identifies a portion of the streaming data as compressible data or white space data. The transmission session is interrupted to request and receive control information on the wireless channel, using the channel space made available by not transmitting the portion of data or by transmitting the portion of data in a more compressed format. In the preferred embodiment, the streaming data comprises speech data, and the identified portion represents a pause in speech within the speech data.

Figure 1:
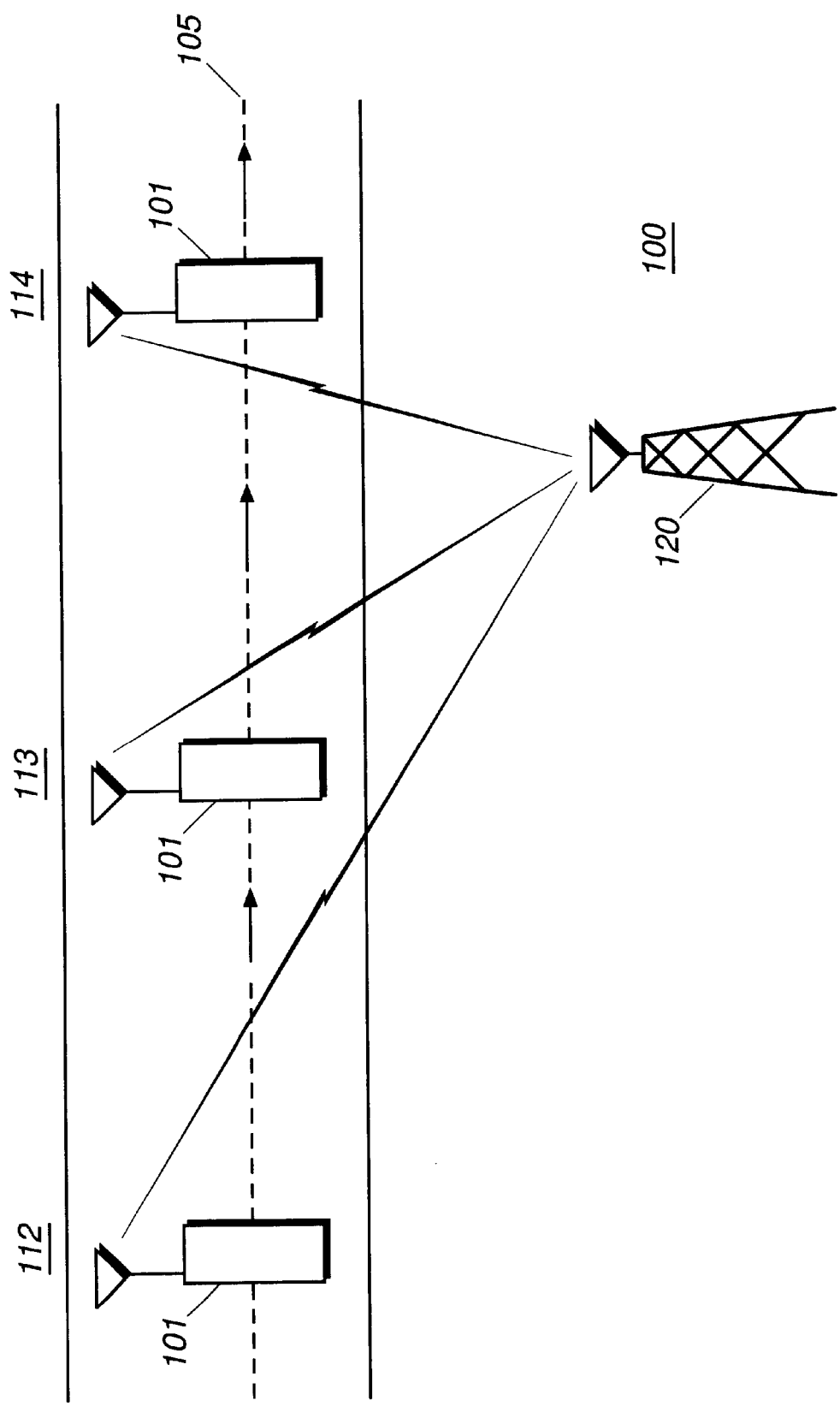
FIG. 1 shows a portion of a radio communication system having a mobile radio in transition while communicating with a fixed station, in accordance of the present invention.

FIG. 1 shows a radio communication system 100, in accordance with the present invention. In the preferred embodiment, the system 100 supports telephone, dispatch, data, and other communication services over a wireless radio frequency network, using a frequency division multiple access protocol. The system 100 includes fixed stations 120 (only one shown) and mobile radios 101 (only one shown). A fixed station 120 is a communication device that operates as part of the infrastructure of the radio communication system 100 and is sometimes referred to as a base station or infrastructure equipment. The fixed station 120 provides communication support for a particular coverage area. A mobile radio 101 is a communication device that operates as a subscriber unit within the system 100. The mobile radio 101, which may frequently change geographic locations, interfaces with the fixed station 120 while in the coverage area of the fixed station 120.

Mobile radios and fixed stations communicate with each other over wireless radio frequency links. Ordinarily, a fixed station supports a plurality of channels that may comprise different frequencies, or different time slots on one or more frequencies. Generally, the channels include a control channel for the communication of control information between the mobile radio and the fixed station, and voice and/or data channels to support general communication services. In the preferred embodiment, the mobile radio ordinarily communicates voice and data information to the fixed station over a dedicated frequency channel.

The fixed station 120 exchanges information with the mobile radio 101 in order to establish a power level to be used by the mobile radio when communicating with the fixed station. The power level used may relate to the separation characteristics between the mobile radio and the fixed station, or to overall environmental and operational conditions. Accordingly, as the mobile radio 101 transitions across the coverage area of the fixed station 120, different power levels may be required for balancing good reception characteristics at the fixed station with power consumption considerations at the mobile radio. For example, the mobile radio 101 is shown transitioning along a path 105 through the coverage region of fixed station 120. As the mobile radio passes through various locations 112, 113, 114, different power levels are selected to maintain a communication link between the mobile radio 101 and the fixed station 120 while minimizing power consumption.

Figure 2:
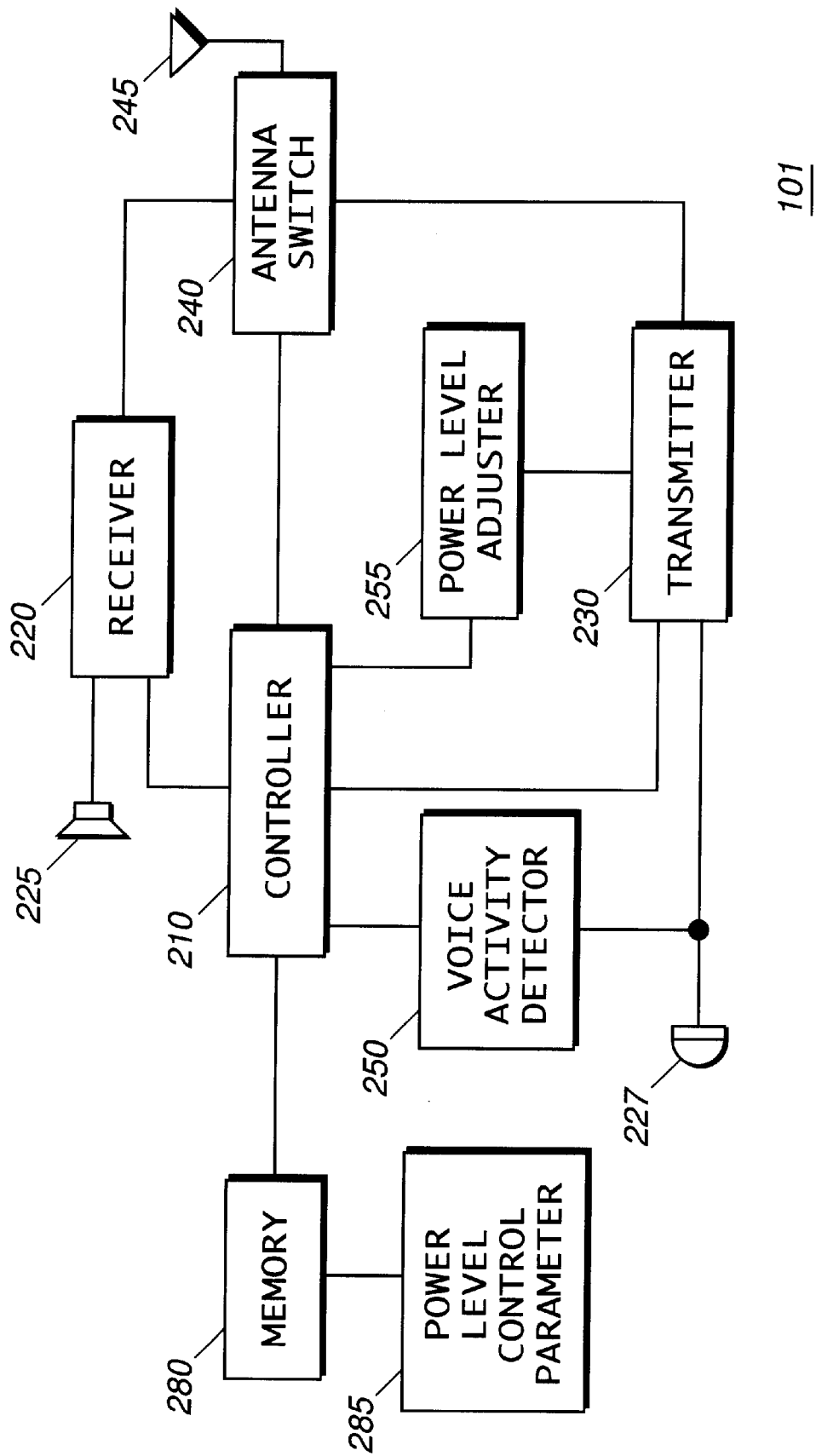
FIG. 2 is a block diagram of a radio communication device, in accordance with the present invention.

FIG. 2 shows an electrical block diagram of the mobile radio 101, in accordance with present invention. In the preferred embodiment, the mobile radio 101 is a battery operated portable radio communication device capable of receive and transmit operations using well-known principles. A controller 210 uses data and instructions from an electrically coupled memory to provide overall operational control of the mobile radio 101. The controller 210 is electrically coupled to a receiver 220 and to a transmitter 230, which are both coupled through an antenna switch 240 to an antenna 245. For receive operations, communication signals are received by the antenna 245 and selectively processed by the receiver 220. Audio signals received by the receiver 220 are outputted by a speaker 225. For transmit operations, a microphone 225 receives speech input and provides corresponding audio signals to the transmitter 230. The transmitter 230 converts the audio signals to radio frequency signals and radiates these signals through the antenna 245.

According to the present invention, the mobile radio 101 includes functional components that provide for the receipt of control information by interrupting continuous transmission of streaming data. The streaming data may be speech, audio, video, or other type of data that is made available continuously, without interruption, for a extended period of time. In the preferred embodiment, power level control information is received during the transmission of speech data, upon detecting a pause in speech. As such, a voice activity detector 250 is coupled to the microphone 255 and uses audio signals therefrom to determine a pause in speech during transmission of speech data control information. A power level control parameter 285 derived in part from the power level control information received is stored in the memory 280. This parameter 285 is used by a power level adjuster 255 to change the power level used by the transmitter 230 during transmit operations.

Figure 3:
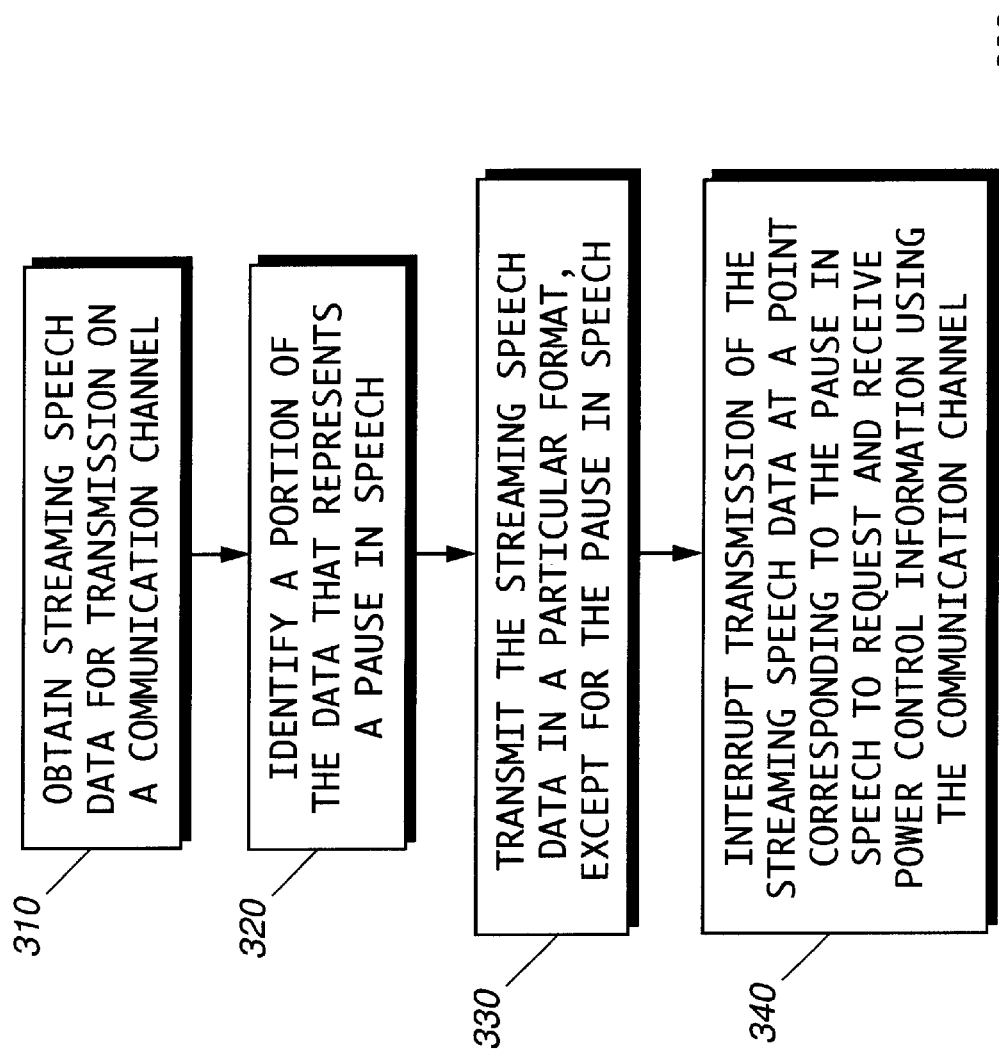
FIG. 3 is a flowchart of procedures used by a mobile radio to receive control information while engaged in a transmission session, in accordance with the present invention.

FIG. 3 shows a flowchart of procedures 300 used at a mobile radio during a transmission session to request and receive control information or other short burst message information from a fixed station, in accordance with the present invention. The mobile radio obtains streaming data for continuous transmission on a communication channel in a particularly format, and identifies a portion of the streaming data as not required to be transmitted in the particular format, steps 310, 320. In the preferred embodiment, the streaming data is speech data from a user or other audio source, and the identified portion the data represents a pause in speech that can be transmitted in a compressed format or not transmitted at all. Preferably, the pause in speech has a duration exceeding a particular threshold, i.e., a time duration that allows request and receipt of the control information. A pause in speech is just one example of data not required to be transmitted, and other types of data such as noise, or white space data. White space data refers to data that may be compressed or otherwise removed without affecting the substantive content of the data.

Upon obtaining the streaming data, the mobile radio initiates a transmission session to transmit the streaming data over a wireless communication channel to the fixed station using, in the preferred embodiment, a frequency division multiple access communication protocol. The streaming data is transmitted over the communication channel in a particular format, except for the identified portion, i.e., the portion representing a pause in speech, step 330. The particular format corresponds to a specific encoding format, for digital transmissions, or a modulation scheme for analog transmissions. At a point corresponding to the pause in speech, the continuous transmission of the streaming speech data is interrupted to request and receive control information using the communication channel, step 340.

Thus, in the preferred embodiment, transmission of the streaming speech data is interrupted, a power control request is transmitted to the communication device, and power control information received from the communication device. Transmission of the streaming speech data is then resumed at a power level based on the power control information received.

Figure 4:
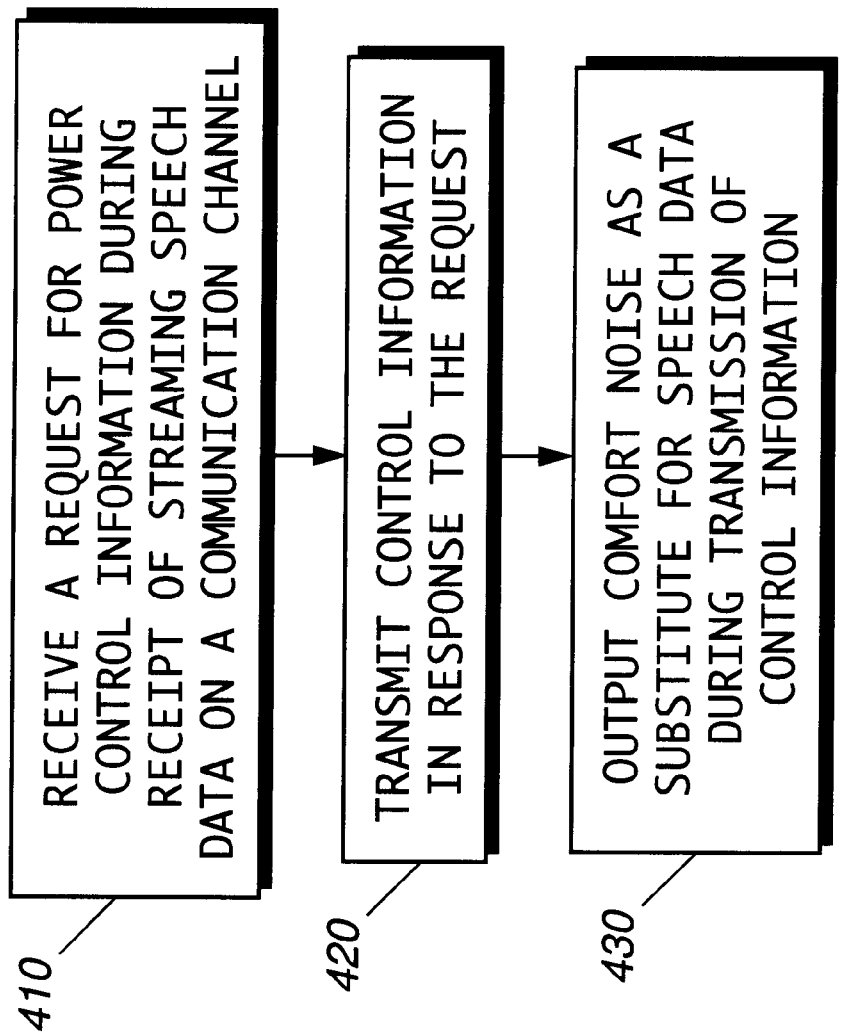
FIG. 4 is a flowchart of procedures used at a fixed station to respond to a request for control information during a transmission session, in accordance with the present invention.

FIG. 4 shows a flowchart of procedures 400 used at a fixed station in responding to a request for control information during receipt of streaming speech data, in accordance present with the invention. At the fixed station, the request for power control information is received from the mobile radio during receipt of streaming speech data, step 410. The fix station responds by transmitting power control information to satisfy the request, step 420. Preferably, the fixed station fills the gap in data by outputting comfort noise, i.e., data intended to mimic the pause in speech data, step 430.

Figure 5:
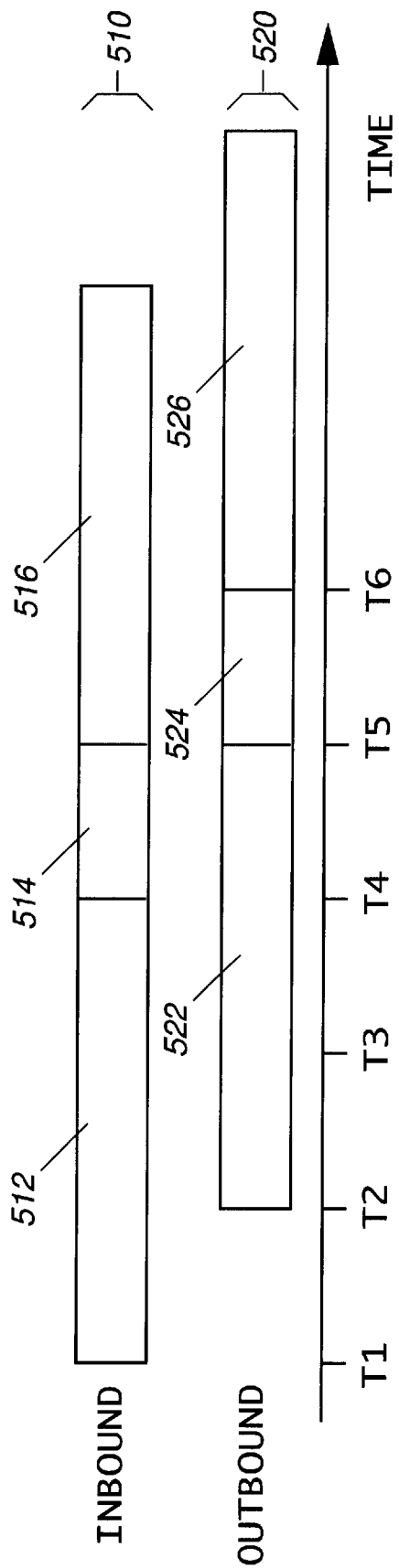
FIG. 5 is a timing diagram showing activity on inbound and outbound channels during a transmission session in which control information is communicated, in accordance with present invention.

FIG. 5 shows a timing diagram of transmit activity on inbound and outbound channels 510, 520 by the mobile radio and fixed station respectively, with respect to effectuating power control during a transmission session, in accordance with the present invention. At a time T1, the mobile radio begins transmitting streaming speech data 512 at full power. At time T2, the fixed station repeats the inbound signal received from a mobile radio on a corresponding slot 522 on an outbound channel 520. At time T3, the mobile radio detects a pause in speech in the transmit audio and informs the fixed station that the mobile radio will dekey to receive power control information. In essence, the mobile radio requests power control information from the fixed station during this period. At time T4, the fixed station begins sending embedded power control information 514 in response to the request from the mobile radio. At time T5, the mobile radio dekeys to receive the power control information, and at time T6, the fixed station detects a pause in the inbound transmission, and maintains the ongoing transmission session by filling the outbound channel with comfort noise 524 as a substitute for the pause in speech data that would ordinarily be received at that point. At time T6, the mobile radio rekeys at a new power level based on the received control information, and at time T7 the fixed station detects the resumption of the inbound transmission of streaming data 516 and begins to repeat the streaming data 526. Thus, power control information is received by interrupting transmission during a break in speech for voice transmission applications.

The present invention provides for significant advantages over the prior art. Previously, a mobile radio engaged in extended continuous transmission on a captured channel, such as a dedicated frequency division multiple access channel, would have to wait until such transmission was terminated before gaining access to updated control information. For example, the mobile radio may be transmitting at one power level when a different power level would be appropriate. The present invention allows for the communication of updated control information, during extended transmission sessions, thereby allowing for quicker adaptations to changing environmental or operating conditions.

What is claimed is:

1. In a radio communication system, a method for obtaining control information during a communication session, the method comprising the steps of:

obtaining streaming data for transmission over a frequency division multiple access (FDMA) wireless communication channel;

transmitting the streaming data over the FDMA wireless communication channel in a continuous manner using a particular format;

interrupting continuous transmission of the streaming data to receive control information, including the steps of:

identifying a portion of the streaming data not required to be transmitted in the particular format; and requesting and receiving power control information via the FDMA wireless communication channel using channel space thereon made available by not transmitting the portion of the streaming data in the particular format.

2. The method of claim 1, wherein the streaming data comprises speech data, and the step of identifying comprises the step of detecting a pause in speech in the speech data.

3. The method of claim 1, further comprising the step of converting the portion of the streaming data to another format more compressed than the particular format.

4. A method, comprising the steps of:

initiating a transmission session to transmit speech data over a wireless communication channel in a particular format;

detecting white space data within the speech data, wherein the white space comprises a pause in speech in the speech data;

interrupting the transmission session to receive information including the steps of:

suppressing transmission of the white space data in the particular format for a particular time period; and requesting and receiving a short burst message over the wireless communication channel during the particular time period.

5. The method of claim 4, wherein the short burst message comprises power control information.

6. The method of claim 4, further comprising the step of transmitting the speech data using a frequency division multiple access communication protocol.

7. A method for obtaining power control information during a communication session between a first communication device and a second communication device in a radio frequency communication system, the method comprising the steps of:

at the first communication device:

obtaining streaming speech data for transmission;

transmitting the streaming speech data over a frequency division multiple access channel to the second communication device, including the steps of:

identifying a portion of the streaming speech data representing a pause in speech;

when the pause in speech has a duration exceeding a particular threshold:

interrupting transmission of the streaming speech data;

transmitting a power control request to the second communication device; and receiving power control information from the second communication device.

8. The method of claim 7, further comprising the steps of resuming transmission of the streaming speech data power level based on the power control information received.

9. The method of claim 7, further comprising the steps of: at the second communication device:

receiving a request for power control information from the first communication device during receipt of streaming speech data;

transmitting power control information in response to the request; and outputting comfort noise as a substitute for expected pause in speech data.

* * * * *